Dec. 13, 1960

J. W. WHITSON 2,964,239

DUPLICATING PUNCH APPARATUS

Filed April 12, 1954

9 Sheets-Sheet 1

INVENTOR.
JOHN W. WHITSON

Dec. 13, 1960 J. W. WHITSON 2,964,239

DUPLICATING PUNCH APPARATUS

Filed April 12, 1954

9 Sheets-Sheet 2

INVENTOR.
JOHN W. WHITSON

Dec. 13, 1960 J. W. WHITSON 2,964,239

DUPLICATING PUNCH APPARATUS

Filed April 12, 1954 9 Sheets-Sheet 3

INVENTOR.

JOHN W. WHITSON

Dec. 13, 1960 J. W. WHITSON 2,964,239

DUPLICATING PUNCH APPARATUS

Filed April 12, 1954

9 Sheets-Sheet 4

INVENTOR.
JOHN W. WHITSON

INVENTOR.
JOHN W. WHITSON

INVENTOR.
JOHN. W. WHITSON

Dec. 13, 1960 J. W. WHITSON 2,964,239

DUPLICATING PUNCH APPARATUS

Filed April 12, 1954 9 Sheets-Sheet 7

INVENTOR.
JOHN W. WHITSON

Dec. 13, 1960 J. W. WHITSON 2,964,239

DUPLICATING PUNCH APPARATUS

Filed April 12, 1954 9 Sheets-Sheet 8

INVENTOR.
JOHN W. WHITSON

Dec. 13, 1960 J. W. WHITSON 2,964,239

DUPLICATING PUNCH APPARATUS

Filed April 12, 1954 9 Sheets-Sheet 9

INVENTOR.
JOHN W. WHITSON

United States Patent Office 2,964,239

Patented Dec. 13, 1960

2,964,239

DUPLICATING PUNCH APPARATUS

John W. Whitson, 120 Cabrini Blvd., New York, N.Y., assignor of one-half to Mrs. Clare H. Whitson, New York, N.Y.

Filed Apr. 12, 1954, Ser. No. 422,417

11 Claims. (Cl. 234—79)

My invention relates to improvements in duplicating punch apparatus for tabulating card accounting systems.

An identification, or control, card, having openings punched therein, which may represent a credit account number, personnel identification number, stock number, etc., is utilized to control elements which duplicate the openings of the control card in a tabulating card to prepare the tabulating card for processing in a tabulating machine accounting system.

Present duplicating machines are used as an integral part of a centralized tabulating machine set-up and are too large, costly and slow in operation to achieve the results obtainable with my duplicating apparatus.

The object of my invention is to provide a small portable duplicating apparatus, which may be moved about as readily as a portable adding machine or typewriter, so that locations, such as those at which credit sales are made or personnel report for work, etc., may be equipped with my machines so that tabulating cards may be prepared for processing in tabulating card accounting systems through the instrumentality of identification, or control, cards prepared with openings representative of tabulating machine accounting data; my apparatus serving to duplicate the openings in the control card into the tabulating card.

Another object of my invention is to provide that tabulating data, such as the dollar amount of a sale, job number, etc., may be manually punched into the tabulating card with the same apparatus.

Another object is to provide that tabulating data common to a series of tabulating cards, such as date, department number, etc., may also be punched automatically into successive tabulating cards.

Another object is to provide that tabulating data such as time, dollar amount, quantity, etc., may be punched in the tabulating card by associating my machine with such mechanisms as time clocks, gasoline pumps, scales, and other devices equipped with registering means so that elements of such mechanisms can co-act with elements of my apparatus to punch the tabulating card also.

Further objects of my invention will appear from the attached description of the same hereinafter.

While my invention is capable of embodiment in many different forms, for the purpose of illustration I have shown only certain forms of the same in the accompanying drawings, in which.

Figures 6, 7, 8, 9, 10, 11, 12:
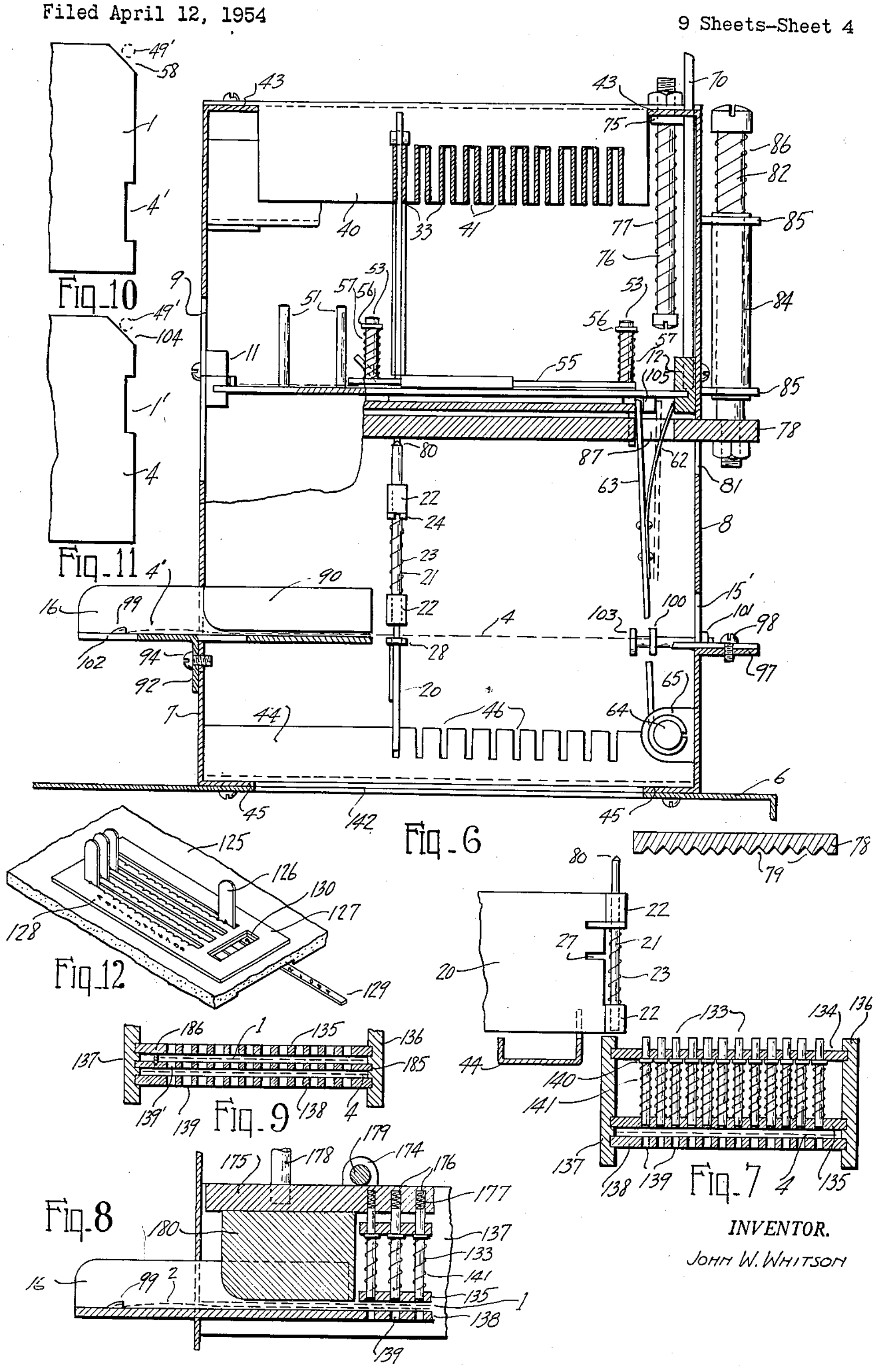
Fig. 6 is a vertical sectional taken taken on line 6—6 of Fig. 5. (For purpose of clarity only one sensing finger and punch frame is illustrated.)

Fig. 7 is a transverse sectional view illustrating a variant of the tabulating card punching means.

Fig. 8 is a longitudinal sectional view illustrating a modification of the elements illustrated in Fig. 7.

Fig. 9 is a transverse sectional view illustrating a modification of the mechanism illustrated in Fig. 8.

Fig. 10 is a plan view of the right hand portion of a control card for use with the mechanism illustrated in Fig. 8.

Fig. 11 is a plan view of the right hand portion of a tabulating card for use with the mechanism illustrated in Fig. 8.

Fig. 12 is a perspective view of a manual means for positioning the sensing finger and punch frames.

Figures 13, 14:
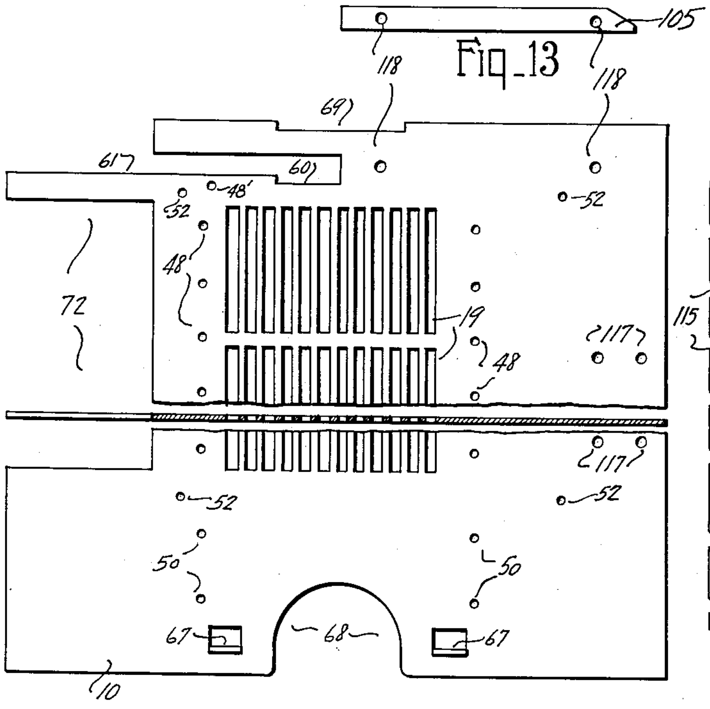

Fig. 13 is a plan view of a stop for a tabulating card latch.

Fig. 14 is a plan and sectional view of a shuttle plate for the control card.

Figure 15:
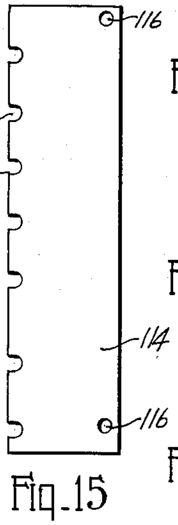

Fig. 15 is a plan view of a sensing finger slide.

Figure 16:

Fig. 16 is a vertical view of a control card guide pin.

Figure 17:

Fig. 17 is a vertical view of a control card guide pin.

Figure 18:
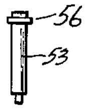

Fig. 18 is a vertical view of a pressure plate guide pin.

Figure 19:
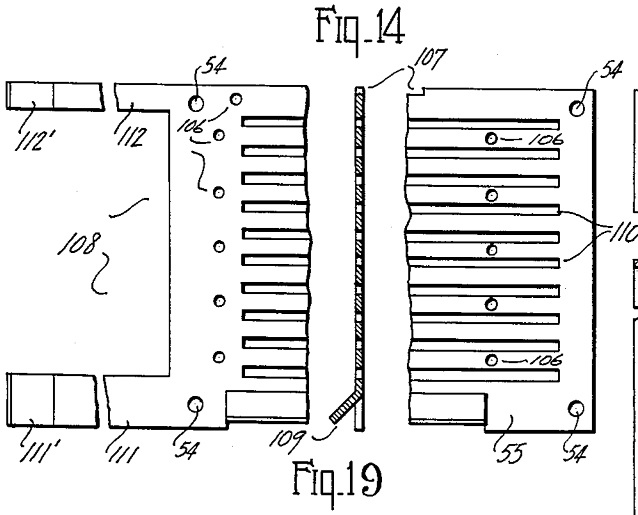

Fig. 19 is a plan and sectional view of a control card pressure plate.

Figure 20:
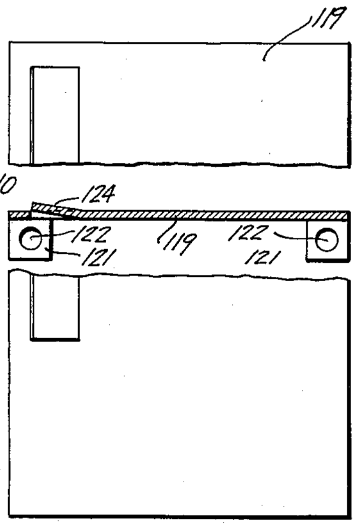

Fig. 20 is a plan and sectional view of a sensing finger latching plate.

Figure 21:
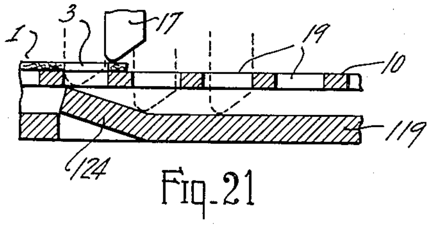

Fig. 21 is a sectional view of a portion of the latching plate, enlarged four times.

Figures 22, 23, 24, 25, 26, 27, 28, 29, 30:
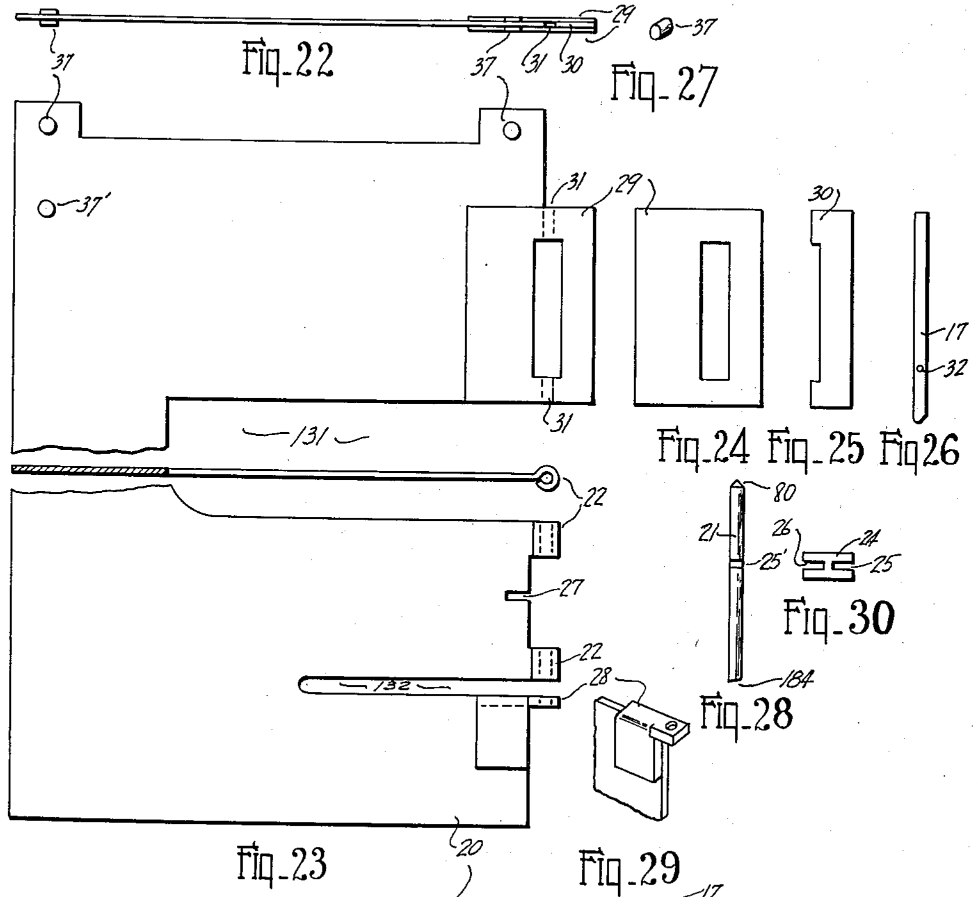

Fig. 22 is a plan view of a sensing finger and punch frame.

Fig. 23 is a side and sectional view of the same.

Fig. 24 is a side view of a sensing finger housing plate.

Fig. 25 is a side view of a filler plate for same.

Fig. 26 is a side view of a sensing finger.

Fig. 27 is a perspective view of a rail guide pin.

Fig. 28 is a side view of a tabulating card punch.

Fig. 29 is a perspective view of a die for same.

Fig. 30 is a plan view of a punch clamp.

Figures 31, 32:
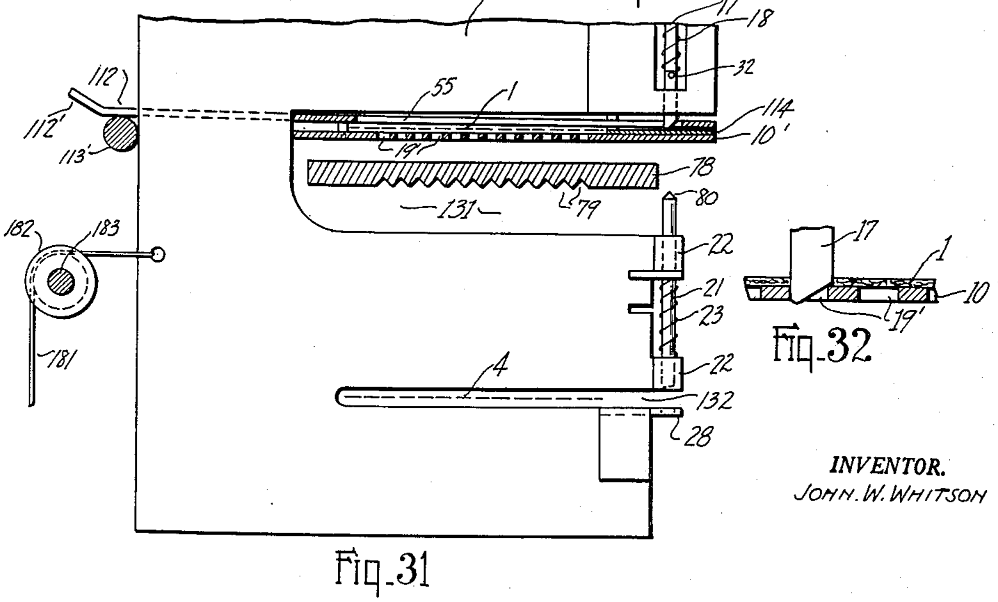

Fig. 31 is a transverse sectional view illustrating the apparatus when operated with a stationary control card.

Fig. 32 is a sectional view of a portion of the control card plate of Fig. 31, enlarged four times.

Figures 33, 34, 35:
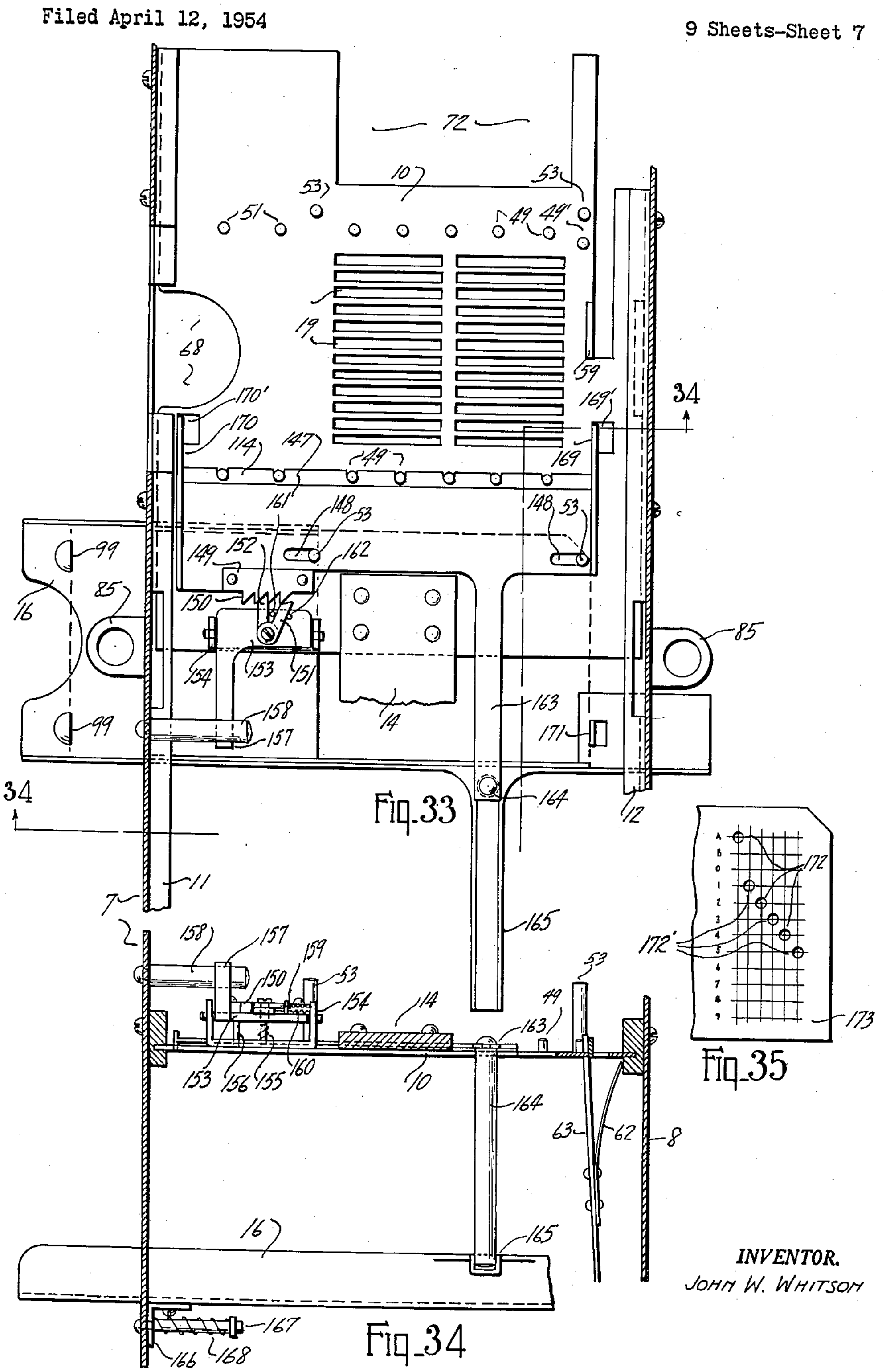

Fig. 33 is a sectional plan view illustrating a modification of the apparatus.

Fig. 34 is a sectional view taken on line 34—34 of Fig. 33.

Fig. 35 is a plan view of the right hand portion of a tabulating card illustrating the spacing of the openings therein when the mechanism illustrated in Figs. 33 and 34 is incorporated in the apparatus.

Figure 36:
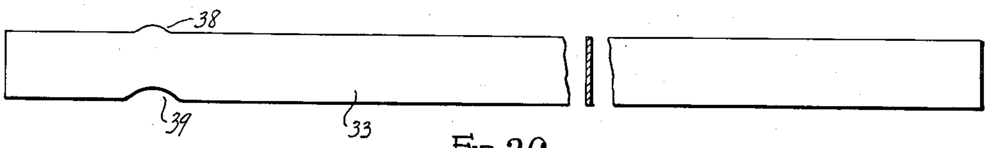

Fig. 36 is a side and sectional view of a sensing finger and punch frame rail.

Figure 37:

Fig. 37 is a sectional view of a control card shuttle rail.

Figure 38:
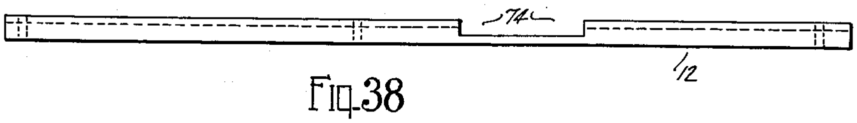

Fig. 38 is a plan view of a rear rail for a control card shuttle.

Figures 39, 40:
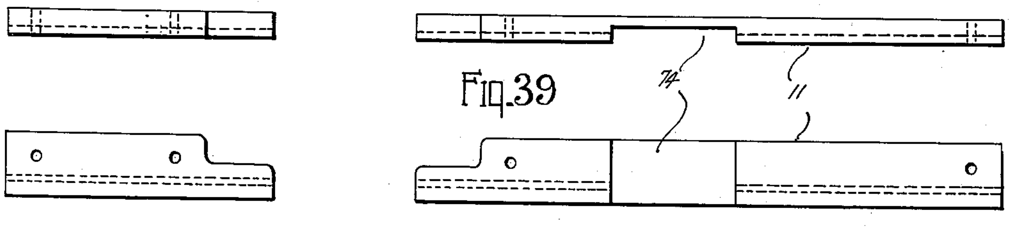

Fig. 39 is a plan view of a front rail for same.

Fig. 40 is a front view of the rail illustrated in Fig. 39.

Figure 41:
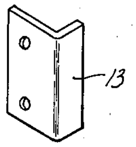

Fig. 41 is a perspective view of a rail stop.

Figure 42:
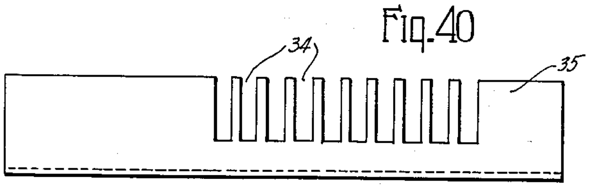

Fig. 42 is a side view of a rail supporting comb.

Figure 43:
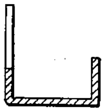

Fig. 43 is a sectional view of same.

Figure 44:
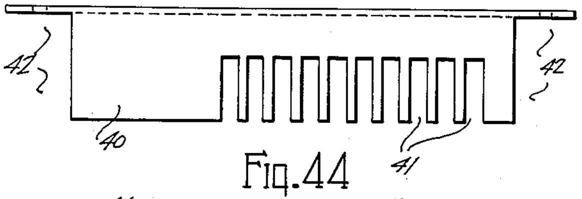

Fig. 44 is a side view of a rail hold-down comb.

Figure 45:
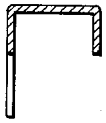

Fig. 45 is a sectional view of same.

Figure 46:
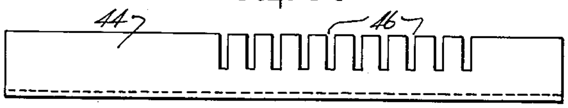

Fig. 46 is a side view of a guide comb for a sensing finger and punch frame.

Figure 47:
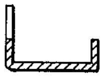

Fig. 47 is a sectional view of same.

Figure 48:
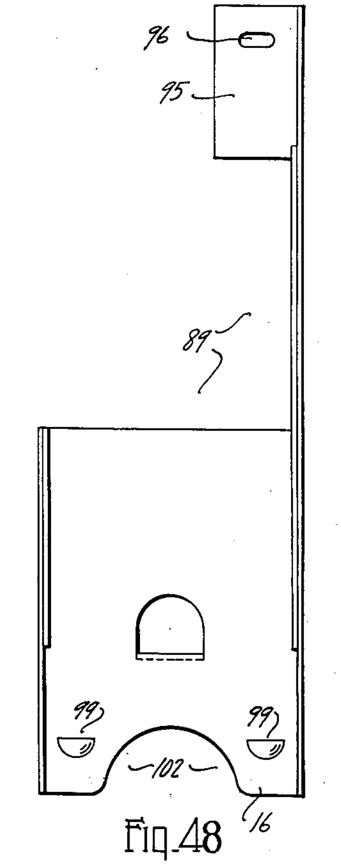

Fig. 48 is a plan view of a tabulating card guide.

Figure 49:
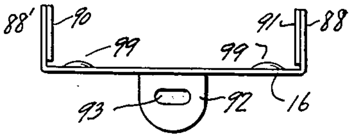

Fig. 49 is a front view of same.

Figure 50:
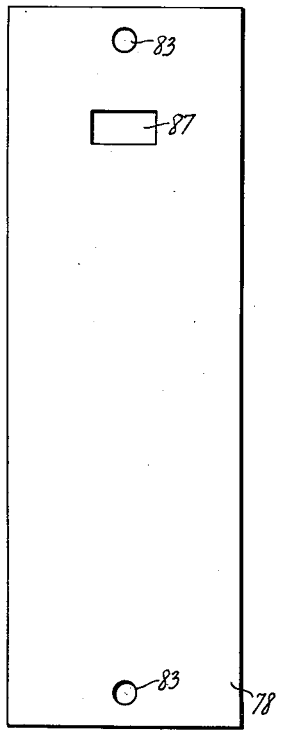

Fig. 50 is a plan view of a tabulating punch pressure plate.

Figure 51:
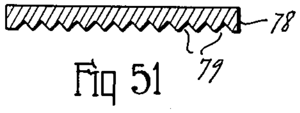

Fig. 51 is a transverse sectional view of same.

Figure 52:
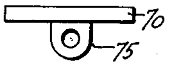

Fig. 52 is a plan view of an operating slide.

Figure 53:
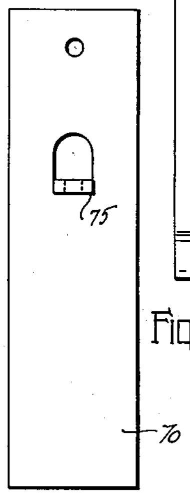

Fig. 53 is a front view of same.

Figure 54:
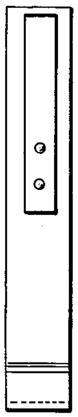

Fig. 54 is a rear view of a shuttle latch.

Figure 55:
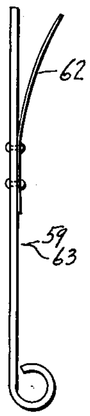

Fig. 55 is a side view of same.

In the drawings I have shown an identification, or control, card 1, having a portion 2 for receiving a name and address, and with openings punched therein as at 3 representing an identification number as is the practice in punch card accounting systems.

When the control card and a blank tabulating, or punch card, 4 are placed in the apparatus it will operate so as to reproduce the openings 3' in the tabulating card in the same pattern as illustrated by the openings 3 in the control card.

The tabulating card also has openings 5 formed therein which are produced by the mechanism illustrated in Fig. 12 and represent the amount $37.25. The openings 3 and 3' represent account number A–12345.

The apparatus comprises a base 6 supporting a front wall 7 and a rear wall 8. The front wall has an opening 9 for receiving the control card, shown positioned (in dotted lines) on control card shuttle 10 which slides in rails 11 and 12 which have rail stops 13 at their ends to arrest the movement of the shuttle when it is moved to the right by operating handle 14.

Openings 15 and 15' in the front and rear walls receive tabulating card guide 16. Tabulating card 4 is illustrated (in dotted lines) positioned in guide 16.

The movement of shuttle 10, to the right, brings each of the openings 3 in the control card under a complementary sensing finger 17 which is pressed downwardly by the spring 18 to enter its opening 3 and a complementing slot 19 in the shuttle, engaging the left hand wall of the slot as illustrated in Fig. 21, this results in the sensing finger and punch frame 20 following the movement of the shuttle so as to position punch 21 in relation to the tabulating card as is the opening 3 to the control card. Thus a series of punches would be positioned to punch the openings 3' in the tabulating card to match the pattern of the openings 3 in the control card.

Punch 21 is journaled in frame 20 as illustrated at 22 and is maintained in raised position by the spring 23 bearing against punch clamp 24 which has an opening 25 to accommodate slots 25' in the punch, opening 26 in the clamp accommodates the edge of frame 20, opening 27 in the frame is for the purpose of assembling the punch, spring, and clamp in the frame. Die 28 is fastened to frame 20 to align with punch 21.

Sensing finger 17 is mounted in a housing comprising two plates 29 assembled together with a filler plate 30. The assembly is mounted on frame 20 so as to leave a slot 31 to accommodate the vertical movement of the sensing finger. With the sensing finger and its spring 18 assembled in the slot 31 stop pin 32 is positioned in the sensing finger to maintain the assembly in place.

Pairs of rails 33 with a frame 20 between them are fitted into slots 34 of rail supporting combs 35 which are fastened to members 36 extruded from front and rear walls 7 and 8. Pins 37 are pressed into frame 20 and slidably mount the frame on the rails. A projection 38 formed on the upper edges of the rails 33 serves to retard the movement of the frame 20 until its sensing finger has picked up an opening 3 in the control card. The notch 39 on the lower edges of the rails 33 accommodates pin 37' when the pin 37, directly above it, is passing over the projection 38. The pin 37' and the upper edges of plates 29 serve as a lower guide means for the frame 20.

Comb 40 has slots 41 for receiving the rails 33 and notches 42 for receiving the upper flanges 43 of front and rear walls 7 and 8. With comb 40 fastened to the flanges 43, as illustrated, the rail and frame assembly is locked in position in the apparatus.

A comb 44 fastened to the lower flanges 45 of front and rear walls 7 and 8 has slots 46 for slidably receiving and laterally supporting the lower edge of frames 20.

Channels 47 are fastened to the flanges 45 at the lower corners of the front and rear walls to serve as framing members.

Fig. 14 illustrates the control card shuttle 10 provided with a series of openings 48 for receiving guide pins 49 and openings 50 for receiving guide pins 51. The guide pins 49 and 51 serve to laterally position the control card on the shuttle. Openings 52 receive guide pins 53 which in turn are received in openings 54 in control card pressure pad 55. The pins 53 are equipped with snap washers 56 which in combination with the springs 57 serve to keep pressure pad 55 pressed against the upper surface of the control card so that when the sensing pins are being removed from the openings 3, the control card will not be moved upwardly by the upward movement of the sensing fingers and thus subject the control card to damage.

Stop pin 49' is positioned in opening 48' so that the pin will accommodate cut corner 58 of the control card permitting the edge of the control card to bear against the shuttle latch 59 and move it out of opening 60 in the shuttle, thus permitting the shuttle to be moved and position the frames 20 in relation to the openings 3 pattern in the control card only when a credit card is normally positioned in the shuttle, as the shuttle is moved latch 59 bears against edge 61.

A spring 62 is fastened to latch 59 and bears against the rail 12 as does the spring 62 of tabulating card latch 63. The latches 59 and 63 are journaled on bearing pin 64 which is supported in members 65 which are extruded from rear wall 8, pin 64 is maintained in position with snap washers. A member 66, extruded from rear wall 8 is positioned to receive the thrust of latch 59.

Shuttle 10 has extruded card stop members 67 against which the control card is pressed by the latch 59 so as to maintain the openings 3 in alignment with the sensing fingers.

Opening 68 provides for the easy insertion and removal of the control card and with opening 69 accommodates the operating slide members 70 which are fastened together by the operating bar 71. Opening 72 in the shuttle 10 accommodates the frames 20.

The operating slides 70 are journaled in openings 73 of upper flanges 43 of front and rear walls 7 and 8 and in slots 74 of front rail 11 and rear rail 12. Stop member 75, extruded from the slide 70, limits the upward movement of the slide and the slide is maintained in its normally upward position through the action of lift pin 76 and its spring 77, pin 76 is fastened into flange 43, is secured with a lock nut, and passes through an opening in the stop member 75.

Only when shuttle 10 is moved to its extreme right, against the rail stops 13, can the slides 70 be caused to enter the openings 68 and 69 by downward pressure on operating bar 71, to bear against punch pressure plate 78 so as to move it downwardly to bear against punches 21 to move them downwardly and cause them to punch openings 3' in the tabulating card to match the openings 3 in the control card.

Pressure plate 78 has a series of angular grooves 79 designed to receive the conical ends 80 of the punches 21. The function of the grooves being, that when the conical punch ends enter the grooves, a final and more accurate alignment of the opening 3' pattern results than would be possible if entire dependence were placed on the give and take tolerances customary in mechanisms of the character disclosed. The grooves 79 may be formed in only that portion of the pressure plate which contacts the punches or the plate may be formed of an extruded section with the grooves formed in the entire length of the plate.

The pressure plate extends through openings 81 in the front and rear walls 7 and 8, the openings limit the vertical movement of the plate. Guide pins 82 are fitted into openings 83 in the pressure plate and are journaled in bushings 84 which are held in members 85 which are extruded from front and rear walls 7 and 8, spring 86 maintains the pressure plate assembly in normally upward position. An opening 87 in the pressure plate receives tabulating card latch 63.

The tabulating card guide 16 comprises a channel-shaped section with flanges 88 and 88', and a cut out portion 89 for the reception of the frames 20. Fastened to the flanges are card guide members 90 and 91. A fastening member 92, with an elongated opening 93 for the reception of screw 94, is extruded from guide 16. A rear portion 95 with an elongated opening 96 extends through opening 15' in rear wall 8 and is fastened to a member 97, extruded rearwardly from rear wall 8, by the screw 98. The members 92 and 95 with their related elements provide a means for the lateral adjustment of the tabulating card relative to the punches 21 and their related elements. Extruded in the outer end of guide 16 are card stop members 99. An adjustable card stop 100 is screwed into rear wall 8 and locked therein with lock nut 101. Stop 100 is adjusted so that the tabulating card will be slightly bowed in its outer portion, as at 4', to bear against the stops 99 to maintain the rear edge of the tabulating card in alignment with the rear edge of the control card so that the opening patterns 3 and 3' will be positioned alike in each card. Opening 102 provides for the convenient insertion and removal of the tabulating card. A stop 103, similar to stop 100 is positioned to receive cut corner 104 of the tabulating card. Stop 100 provides a means for longitudinal adjustment of the tabulating card relative to the punches 21 and their associated elements.

When a tabulating card is positioned in the guide 16 the rear edge of the card contacts the latch 63 to move it rearwardly out of obstructing position relative to the stop 105 which is fastened to the underside of shuttle 10 so as to bear against latch 63 when a tabulating card is not positioned in the guide 16. Thus the latches 59 and 63 with their associated elements provide a movable immobilizing means insuring the immobilization of the apparatus until both the control and tabulating cards are normally positioned in the apparatus. The latch 63 may also be shortened and positioned to bear against the underside of plate 78 to obstruct its downward movement to immobilize the apparatus when a tabulating card is not present in guide 16; with the tabulating card present the latch end would pass through the opening in plate 78.

Control card pressure plate 55 has openings 106 to slidably receive the guide pins 49 and the stop pin 49' and openings 54 to slidably receive guide pins 53. Opening 107 receives the latch 59 and opening 108 receives the frames 20. Inclined portion 109 provides for the easy insertion of the control card under the edge of the pressure plate. Openings 110 receive the sensing fingers 17. Members 111 and 112 have inclined portions 111' and 112' which bear against lift rod 113 and in this position maintain the pressure plate elevated so that the control card may be inserted under it. When shuttle 10 is moved and members 111 and 112 are out of contact with rod 113 the springs 57 maintain the pressure plate pressed against the upper surface of the credit card, thus insuring the proper entry and exit of the sensing fingers 17 through the openings 3 in the control card.

Lift rod 113 is mounted in front and rear walls 7 and 8 and maintained in position with snap washers.

The sensing fingers normally rest on a sensing finger slide 114, the approximate thickness of the control card, which is fastened to shuttle 10 directly under the sensing fingers. Then openings 115 (illustrated in Fig. 14) receive the pins 49 and 51 (illustrated in Figs. 16 and 17) and the openings 116 receive the pins 53 (illustrated in Fig. 18).

Handle 14 is fastened to shuttle 10 with rivets in openings 117.

Stop 105 is likewise fastened, to the underside of shuttle 10, with rivets in openings 118.

A latch plate 119 is supported under shuttle 10 by rods 120 which are fastened into front and rear walls 7 and 8 and maintained in position with snap washers. Plate 119 has downwardly extending members 121 with openings 122 for mounting the plate on the rods 120. Bushings 123 position the plate on the rods 120. Inclined portion 124 is positioned under the normal position of the sensing fingers as illustrated in Fig. 21.

Fig. 21 illustrates the shuttle 10 as having moved the control card under a sensing finger 17 with the finger ready to enter an opening 3 in the control card and hence opening 19 in the shuttle; motivated by the action of spring 18, continued movement of the shuttle will cause contact between the finger 17 and the left wall of opening 19, to cause the sensing finger to move along inclined member 124 and along the upper surface of latching plate 119. When the direction of the shuttle 10 is reversed the sensing finger will contact the right wall of opening 19 and be moved across the upper surface of plate 119 and up inclined member 124 so that continued movement of the shuttle will contact the upper right hand edge of opening 119 with the inclined lower edge of the sensing finger to move it upwardly out of opening 19 and opening 3 in the control card so that when the shuttle is returned to its normal position the sensing fingers will rest on slide 114.

A suitable cover, as illustrated at 125, forms a housing for the apparatus.

The foregoing discloses an apparatus having a movable control card with a plurality of openings therein representative of statistical data which openings control sensing fingers each of which is an element of a movable frame which supports a punch for forming an opening in a tabulating card. Each sensing finger bears against the upper surface of the control card, to enter one of the openings therein and detachably interlock with other elements of the apparatus so that its frame may be moved to position its punch to form an opening in the tabulating card to match the position of the opening in the control card, thus providing for the duplication, in the tabulating card, of the plurality of openings in the control card. The apparatus remains immobilized until the control and tabulating cards have been positioned therein.

Fig. 12 illustrates a manual means for positioning the frames 20. A finger 126 is fastened to the frame 20 and extends through a slotted plate 127, fastened to the outer cover 125, there being a slot for each finger 126. One side of the finger has a projection which co-acts with indentations on one edge of the slot, to hold the frame 20 positioned for punching the tabulating card, the indentations being spaced as is illustrated for the openings 3' in the tabulating card Fig. 2. The indentations are characterized by markings as at 128. A sliding member 129, with markings in reverse, is fastened to each finger 126. In operation after the shuttle 10 has been fully moved to the right then if it is desired to punch the tabulating card to record the amount $37.25 the first finger 126 would be moved to indentation "3," the second finger to indentation "7," the third finger to indentation "2" and the fourth finger to indentation "5," with the fingers thus positioned the apparatus when operated would produce the openings 5 in the tabulating card as well as the opening 3 pattern of the control card as illustrated at 3'. The amount 37.25 would also be visible in opening 130.

The apparatus may be associated with any mechanism having quantity registering elements so that the frames 20 would be actuated by such elements to be positioned to punch openings, in the tabulating card, as illustrated by openings 5.

The openings 131 in frames 20 which receive the shuttle 10 may be elongated so that when positioned, by the fingers 126, they would remain so positioned and not be moved therefrom by the return movement of the shuttle thus providing for the automatic punching of openings in a plurality of tabulating cards representing data such as "date," "location," etc.

Frames 20 which are positioned by the fingers 126 do not require a sensing finger and its related elements.

Fig. 7 illustrates how the mechanism would also serve to operate to punch the tabulating card with a row of fixed position punches. A series of punches 133 are housed, for vertical movement, in aligned rows, one row for each of the frames 20, in upper and lower guide plates 134 and 135, which are fastened in side plates 136 and 137 which are fastened into front and rear walls 7 and 8, a die plate 138, having openings 139 each positioned under a punch 133, is fastened into side plates 136 and 137 and under plate 135 so as to leave a space for the insertion of the tabulating card 4. A collar 140 is fastened to each punch 133 and bears against the underside of plate 134 through the action of spring 141.

In operation a frame 20 is moved as hereinbefore described so that a punch 21 will be directly over a punch 133 and serve as an interposer means so that downward movement of punch 21 will also move punch 133 to punch an opening in the tabulating card.

An opening 142 in base 6 provides for the punchings from openings 3' and 5, in the tabulating card, falling into a suitable container, removably housed in the base.

Figure 1:
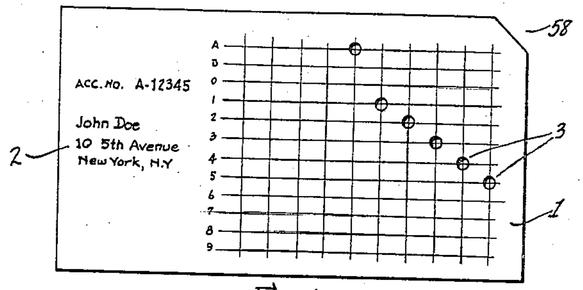
Fig. 1 is a plan view of an identification, or control, card made in accordance with this invention.
Figures 2, 3:
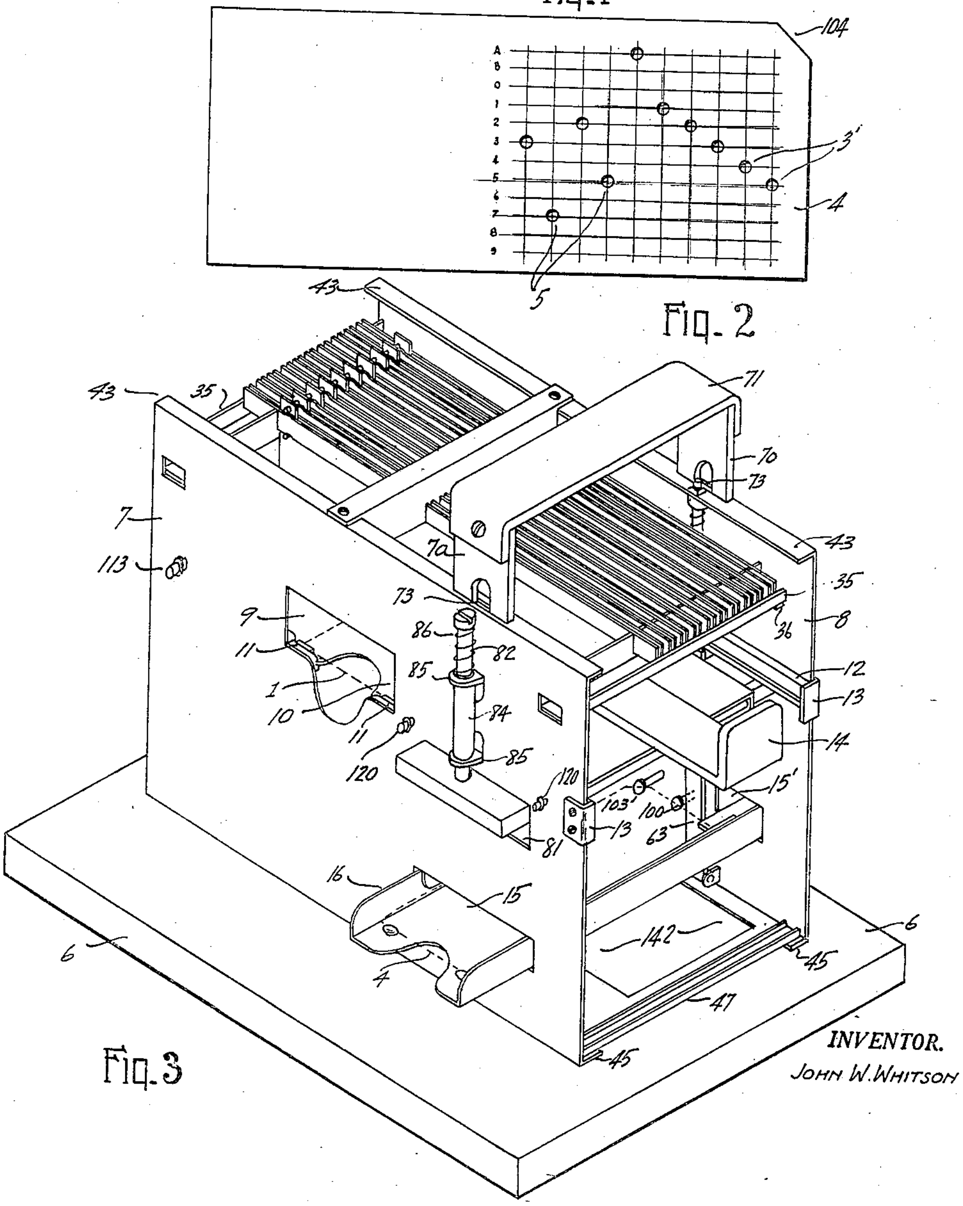
Fig. 2 is a plan view of a tabulating, or punch, card.
Fig. 3 is a perspective view of an apparatus made in accordance with this invention. (For purpose of clarity the sensing finger and punch frames are not illustrated relative to the tabulating card.)

The tabulating card illustrated in Fig. 2 is a full scale view of an Underwood-Samas 40 column card, the openings of which are .093 inch in diameter and are positioned at .142 inch vertical centers and are normally positioned at .107 inch horizontal centers; however, the openings 3' and 5 are illustrated positioned at .214 inch horizontal centers as are the openings 3 in the control card illustrated in Fig. 1. The openings are punched in alternate columns, or double spacing, to provide space for more substantial construction of the frame 20 and its elements than would be possible if single column spacing was used. When necessary to utilize the normal horizontal spacing of the openings, as illustrated in Fig. 35, then elements as hereinafter described may be incorporated in the apparatus.

Figs. 33 and 34 illustrate a plate 147 mounted to slide on plate 114 as indicated by the elongated openings 148. Mounted on plate 114 is rack 149 having teeth 150 which coact with ratchets 151 and 152 which are journaled on member 153 which is journaled in the frame 154 which is fastened to shuttle plate 10. A spring 155 causes member 153 to bear against stop 156 when ratchet 151 is engaged by rack 150. An arm 157 on member 153 engages a pin 158 fastened into front wall 7 and when so engaged lifts the ratchet 151 from the rack and engages the rack with ratchet 152. Springs 159 and 160 also serve to maintain the ratchets engaged with the rack, with the movement of the ratchets limited by stop pins 161 and 162.

Fastened into arm 163 of plate 147 is pin 164. Pin 164 slides in a channel-shaped member 165 which is fastened into the tabulating guide 16 which is mounted to slide in the openings 15 and 15' of the front and rear walls 7 and 8. Angle member 166 is fastened to guide 16 and has an opening to receive pin 167 which is fastened into front wall 7. Spring 168 normally maintains member 166 against front wall 7.

In operation the control card is placed in the control card shuttle 10 to bear against a rear stop 169 and a front stop 170, each of which have members extending below the level of shuttle 10 through openings 169' and 170' formed therein. The stops 169 and 170 are formed on plate 147. The pressure plate 55 will be formed to receive plate 147.

The tabulating card is placed in guide 16 to bear against rear stop 171 and front stops 99. Guide 16 is then manually moved rearwardly; this serves to move plate 147 likewise due to the relationship of pin 164 with channel 165. The teeth 150 of rack 149 are spaced at .107 inch centers as are the openings 172 and 172' of the tabulating card 173 illustrated in Fig. 35. The control card, not illustrated, would also have similar openings thus spaced.

The ratchet 152 would operate to engage the rack 149 at this rearward position so that when arm 157 moves away from pin 158, through the movement of shuttle 10 to the right, ratchet 151 will engage the rack to position the control card to move the three frames 20 whose punches 21 will punch the openings 172 in the tabulating card when operating bar 71 is pressed. When shuttle 10 is returned to its normal position arm 157 will contact pin 158 to lift ratchet 151 and engage the rack with ratchet 152 so that when the shuttle 10 is again moved ratchet 151 will engage again the rack to position the control and tabulating cards so that the three frames 20 will position to punch openings 172' in the tabulating card when operating bar 71 is pressed.

The shuttle is thus returned to normal position and the cards removed leaving the guide 16 and the slide 147 and their elements in their normal positions, as illustrated in Figs. 33 and 34.

The ratchet elements thus described provide for a spacing mechanism similar to the carriage spacing mechanism of a typewriter and such mechanism could be substituted for that illustrated.

The apparatus illustrated requires only three of the frames 20 to punch a six digit number; however, a greater or lesser number of frames may be employed. The punching may be done with a single frame 20 in which case the shuttle 10 would be cycled once for each digit to be punched.

The control cards may be used to punch a single tabulating card, one for punching a set of openings 3' in the tabulating card, as illustrated in Fig. 2, and the other control card to punch a second set of openings positioned between the openings of the first set. In operation the first control card is inserted in the shuttle, guide 16, containing the tabulating card, is moved to its rearmost position, the apparatus is cycled to punch the first set of openings 3' in the tabulating card, the first control card is replaced with the second control card and the apparatus cycled to punch a second set of openings in the tabulating card, positioned between the openings of the first set.

Figure 4:
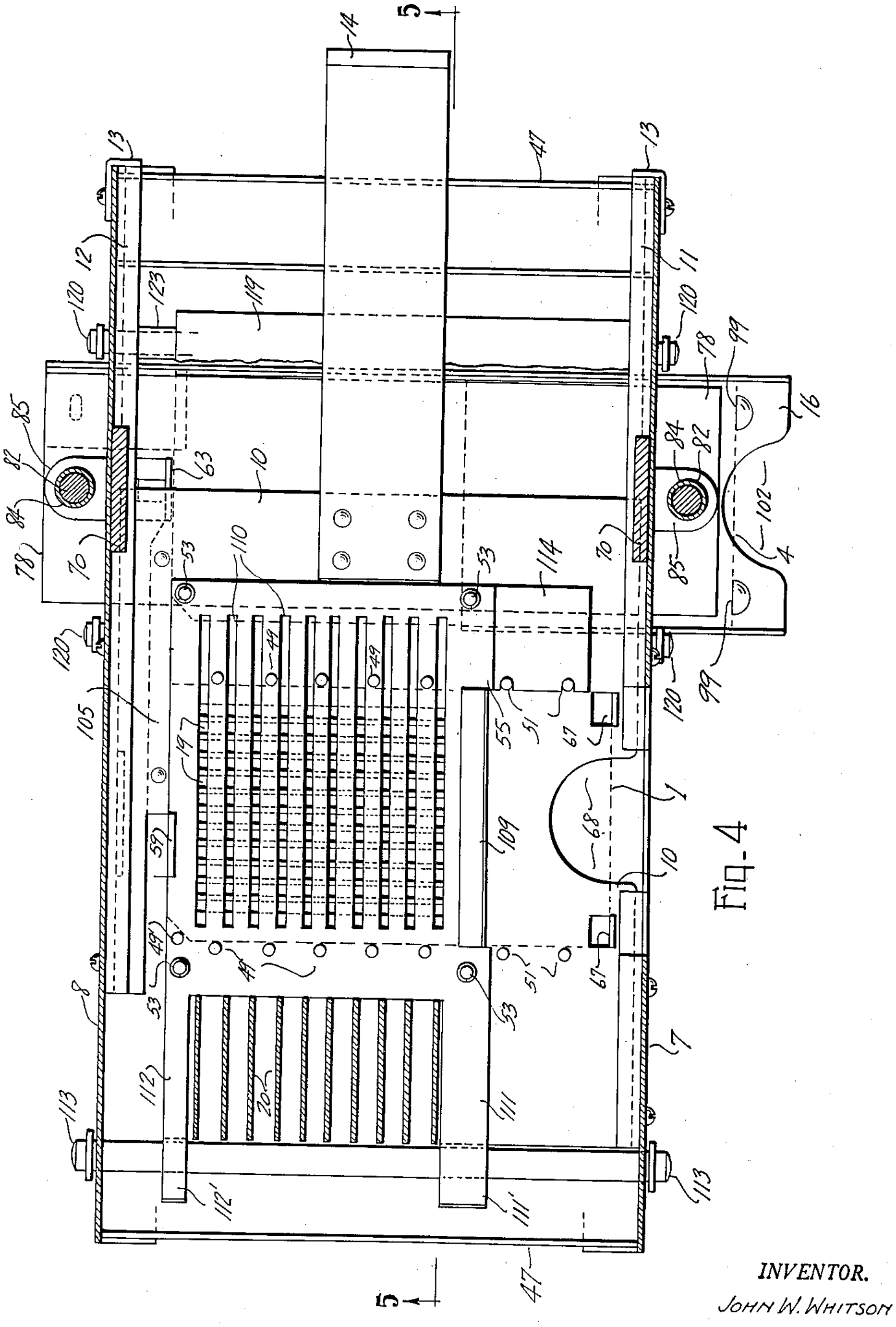
Fig. 4 is a sectional plan view taken on line 4—4 of Fig. 5.
Figure 5:
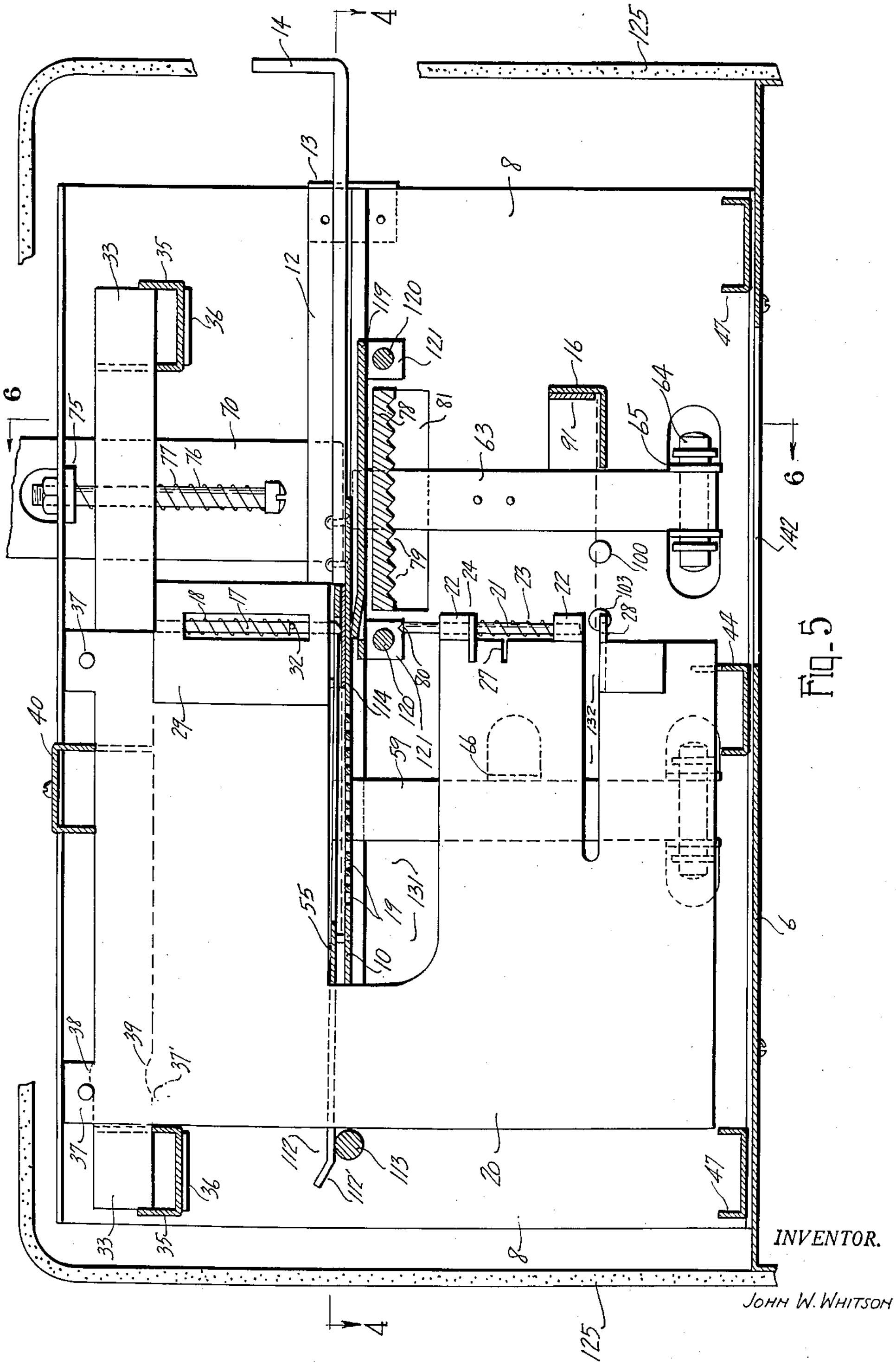
Fig. 5 is a vertical sectional view taken on line 5—5 of Fig. 4.

With plate 147 arranged to move only the guide 16 and with shuttle 10 arranged to hold the control card stationary, as illustrated in Fig. 4, then by cycling the apparatus once for each control card the tabulating card will be punched with two sets of openings 3' each complementing openings 3 in each of the control cards. The stops 100 and 103 may be made adjustable in two positions to serve the same purpose of double punching the tabulating card.

Fig. 8 illustrates how the openings 3' may be punched in the tabulating card without employing the frames 20.

The side plates 136 and 137 are extended, each at two positions, as at 174, to laterally support a pressure plate 175 having openings 176, each of which receives the upper end of a punch 133 and contains a spring 177 which bears against the punch end to force the punch downward when pressure is transmitted from pressure plate 78 to pressure plate 175 through the instrumentality of two members 178 which are fastened into plate 175 to bear against the underside of plate 78. Two cross rods 179 limit the upward movement of plate 175.

In operation the tabulating and control cards are positioned with the control card superimposed on the tabulating card, as illustrated in dotted lines, on plate 138, the operating bar 71 is then pressed downwardly to move plate 175 downwardly and cause springs 177 to create sufficient pressure on the punches 133 so that each of the punches would punch an opening in the tabulating card were it not for the fact that all of the punches, except those directly under an opening 3 in the control card, are restrained from doing so by the control card obstructing their downward movement. The pressure of spring 177 would be sufficient to punch the tabulating card but not sufficient to punch through the control card.

Plate 175 may have a resilient pressure block 180 fastened thereto so as to press the control card against the tabulating card when the tabulating card is being punched, then, with the name and address, and account number of the identification, or control, card embossed in the control card, or embossed on a plate fastened thereto, so as to print through an ink ribbon, or equivalent, arranged between the control and tabulating cards, similar to the ink ribbon on an addressograph machine, the downward movement of plate 175 will cause the name and address of the control card to be printed on the tabulating card substantially simultaneous with the openings 3' being punched therein.

The elements of Figs. 7 and 8 may be combined so that a selection of frames 20 would serve to punch a set of openings 5 representative of tabulating data as hereinbefore described, in which event, any desired punches 133 may be extended through plate 175 to be operated by the elements of frames 20; the positions of openings 3' and 5, in the tabulating card, may be reversed and the control card reduced in length so as to leave a portion of the tabulating card uncovered, thus the control card would not be punched by the punches 133 which co-act with frames 20. The control card may also be punched with openings to allow for the passage therethrough of punches which would be controlled by frames 20.

With the mechanism of Fig. 7 and Fig. 8 incorporated in the apparatus, the control and tabulating cards may have openings 1' and 4' formed in their right hand edges, as illustrated in Figs. 10 and 11, the openings being positioned to receive latches for controlling the shuttle similar to latches 59 and 63. A latch operated by the control card would enter opening 1' in the tabulating card 4 and a latch operated by the tabulating card would enter opening 4' in the control card. Thus both cards would have to be normally positioned in the apparatus before it would function. A stop pin, illustrated in dotted lines, similar to stop pin 49', insures that the card will be positioned correctly before the latches can operate.

The latches would extend through the opening 87 in pressure plate 78 to contact stop 105 and hold shuttle 10 against movement.

While I have described the frames 20 as being moved by the instrumentality of the elements of the frame being activated through movement of the control card serving to position the punch 21 for punching the tabulating card, Fig. 31 illustrates how the frame 20 may be moved with the control card remaining stationary.

Fig. 31 illustrates a frame 20 with the tabulating card 4 normally positioned in the tabulating card opening 132 in the frame and the pressure plate 78 normally positioned within the control card openings 131.

A plate 10', which is similar in all respects to shuttle 10 including its elements, is fastened into front and rear walls 7 and 8 with its openings 19' positioned over the angular grooves 79 in pressure plate 78 which is illustrated as being wider than hereinbefore illustrated to provide for a pair of guide pins for plate 78, mounted on the front wall 7, at either side of an opening, similar to opening 9, for the insertion of the control card. The front slide 70 may be widened to include a like opening.

Fig. 31 illustrates the openings 19' as narrower than the openings 19 so as not to allow the sensing pins 17 to pass through them.

Slides 70 may not be required as pressure applied to the guide pins 82, through an operating bar similar to operating bar 71, will effect downward movement of pressure plate 78.

In operation the control and tabulating cards are inserted in their respective positions and when inserted they will move latches, similar to latches 59 and 63, the upper ends of which will bear against the underside of plate 78 to obstruct its downward movement and thus immobilize the apparatus until both cards have been inserted. When the latches have been moved rearwardly by the cards their upper ends will be positioned to enter opening 87 in the plate 78 and thus free the plate for downward movement.

A cable 181 is fastened to frame 20 and passes over a pulley 182 mounted on a shaft 183 which is fastened into front and rear walls 7 and 8; after passing over the pulley the cable may lead to a weight, a coil spring or a spring reel, a pneumatic or hydraulic cylinder, a solenoid, or any similar device which would create a pull on the cable and thus move the frame 20 to the left.

Rod 113', similar to rod 113, is slidably mounted on front and rear walls 7 and 8 and is held in normal position, as illustrated in Fig. 31, by a latch which will open when released by a trigger mechanism, actuated by the initial movement of the operating bar, to permit bar 113' to move with the frames 20 as they move to the left under the pull of their cables 181.

The sensing fingers of each frame, as it moves to the left, will move across the upper face of the control card to enter an opening 3 and thus an opening 19', arresting the frame from further movement and positioning its punch 21 to punch an opening 3' in the tabulating card.

When bar 113' is moved to the right it bears against the frames 20 to move them back to their normal position and bar 113' will be latched to maintain the frames in normal position.

The movement of the bar 113' into normal position will also lift control card pressure plate 55 as hereinbefore described.

With the movement of the frames to the right the sensing fingers will lift from the openings 19' and 3' to move across the card to their normal position on sensing finger slide 114.

The openings in the tabulating cards are spaced close together in order to provide for punching a maximum amount of tabulating data into the card, therefore, the frames 20 must be formed of thin material which lacks the lateral rigidity, or stability, to maintain precision alignment between the die 28 and the punch 21.

A compensating corrective means to insure precision alignment of the punch with the die is now described.

The punch 21 is ground with a relief angle, as at 184, and a purpose of the clamp 24 is to maintain the punch with the heel of the relief angle substantially at a right angle to the longitudinal axis of frame 20; in this position when the punch enters the tabulating card its shearing action, due to the relief angle, causes the punch blank to enter the die to precision align the die under the punch and thus keep the cutting edges of the punch and die from contacting and being damaged thereby.

The end of punch 21 may be ground conical in shape so that the punch blank will tend to be drawn into a cup shape and thus bring about alignment between the punch and die; however, the drawing action would require more pressure, on operating bar 71, than the pressure required for the shearing action.

The frames 20 may be positioned by equipping them to be moved automatically through the instrumentality of a clock mechanism, in which case openings 5 in the tabulating card would indicate time; with the frames 20 associated to be moved through the instrumentality of an accounting mechanism the openings 5 may indicate dollar amount, quantity, etc.

A gear train manually or power operated may be employed to move the shuttle and operating bar 71.

The openings 3 in the control card may include openings to represent the amount of an installment payment, the date due, a location, etc.

The openings in the control card may be produced by manual punching, or from master tabulating cards on automatic reproducing machines as dictated by the tabulating accounting system employed.

The elements of the apparatus may vary in size and shape so as to co-act with the tabulating cards of the different manufacturers of tabulating equipment whose cards vary in size, and also as to the size, shape and spacing of their punched openings.

The control and tabulating cards are illustrated as being of the same width but varying as to length. The cards may also vary in width in which event the control card would be the narrower, so, in order to provide that the openings 3' be properly located in the tabulating card, the pins 49 and 51 in the plates 10 and 10' would be adjusted accordingly; however, in order to accommodate a narrower control card in the structure of Fig. 8 it may include a separate guide means for the control card, accordingly the structure illustrated in Fig. 9 may be included, wherein a plate 185, having openings 139' aligned with the openings 139 of die plate 138, is fastened into side plates 136 and 137 and fastened into plate 185 is side plate 186.

While I have described my invention in detail, I wish it to be understood that many changes may be made therein without departing from the spirit of the same. Accordingly, applicant does not desire to be limited to the specific embodiment disclosed herein primarily for purposes of illustration; but instead, he desires protection falling fairly within the scope of the appended claims.

I claim:

1. In an apparatus of the class described for duplicating an opening positioned within the marginal edges of a control element in a tabulating element; the improvement comprising in combination: sensing and punching means adapted to be transversely moved, relative to the tabulating element, by the control element; means to move a control element guide and the control element for the first named means to sense and engage the opening in the control element for further movement of the control element to move and position the first named means across a face of the tabulating element to punch an opening therein, the opening in position substantially corresponding to that of the opening in the control element; and means to activate the first named means to punch the said opening.

2. In an apparatus of the class described for duplicating an opening positioned within the marginal edges of control element in a tabulating element; the improvement comprising in combination: means to transversely move a control element guide and the control element for a sensing means, which is supported on a frame, to engage the opening in the control element for further movement of the control element to move the said frame and a punching means supported thereon across a face of the tabulating element to position the punching means to punch an opening therein; the opening in position substantially corresponding to that of the opening in the control element; and means to activate the punching means to punch the said opening.

3. In an apparatus of the class described for duplicating an opening positioned within the marginal edges of a control element in a tabulating element; the improvement comprising in combination: sensing and punching means movable across a face of the control element, and substantially in contact therewith, and across a face of the tabulating element, and substantially in contact therewith, to sense and engage the opening in the control element to move and position the punching means to punch an opening in the tabulating element, the opening in position substantially corresponding to that of the opening in the control element; and means to activate the punching means to punch the said opening.

4. In an apparatus of the class described for duplicating an opening positioned within the marginal edges of a control element in a tabulating element; the improvement comprising in combination: means to move a sensing means from normal position and across a face of the control element, and substantially in contact therewith, and into the opening in the control element; punching means movable in unison with the sensing means and across a face of the tabulating element, and substantially in contact therewith, to punch an opening in the tabulating element, the opening in position corresponding to that of the opening in the control element; means to activate the punching means to punch the said opening; and means to return the sensing means to normal position.

5. In an apparatus of the class described for duplicating an area processed for sensing positioned within the marginal edges of a control element in a tabulating element; improvement comprising in combination: means to move a sensing means from normal position and across a face of the control element to engage the sensing means and the processed area of the control element to move and position a processing means across a face of the tabulating element to process an area thereof for sensing; means to activate the processing means to process the tabulating element with the said area for sensing; and means to disengage the sensing means and the processed area of the control element and return the sensing means to normal position.

6. In an apparatus of the class described for duplicating an area processed for sensing positioned within the marginal edges of a control element in a tabulating element; the improvement comprising in combination: a movable frame with sensing and interposer means thereon; means to move the frame from normal position and across a face of the control element to engage the sensing means and the processed area of the control element to move and position the interposer means to actuate a processing means; means to actuate the interposer means and thereby the processing means to process an area of the tabulating element corresponding to the processed area of the control element; and means to disengage the sensing means and the processed area of the control element and return the frame to normal position.

7. In an apparatus of the class described for duplicating an opening positioned within the marginal edges of a control element in a tabulating element; the improvement comprising in combination: a sensing unit mounted on a frame comprising a sensing element; a punching unit mounted on the frame comprising a punch element and a die element; means to move a control element guide means and the control element to engage the opening in the control element and the sensing element for further movement of the control element to move the frame across the face of the tabulating element to position the punching unit to punch an opening therein, the opening in position substantially corresponding to that of the opening in the control element; and means to move the punch element to punch the said openings.

8. In an apparatus of the class described for duplicating an area processed for sensing positioned within the marginal edges of a control element in a tabulating element; the improvement comprising in combination: a frame, transversely movable across a face of the tabulating element, having thereon a sensing assembly comprising a sensing element for engagement with the processed area of the control element and a processing means to process the tabulating element with an area for sensing; means to move the control element to engage the processed area thereof and the sensing element for further movement of the control element to move the frame from normal position and transversely across the said face of the tabulating element to move and position the processing means to process an area of the tabulating element for sensing, the area in position substantially corresponding to that of the processed area of the control element; means to activate the processing means to process the said area; and means to return the frame to normal position.

9. In an apparatus of the class described having a tabulating element with areas within the marginal edges thereof which can be processed for sensing; the improvement comprising in combination: a frame movable across a face of the tabulating element; a processing means mounted on the frame for processing an area of the tabulating element for sensing; means to engage and position a tabulating element positioning means and the tabulating element at a first position at which the tabulating element can be processed with an area for sensing; means to move the frame from normal position to position the processing means across a face of the tabulating element to process the tabulating element with an area for sensing; means to activate the processing means to process the said area; means to return the frame to normal position; releasing means to release the second-named means when the frame is returned to normal position; and moving means to move the tabulating element positioning means, when the second-named means is released, to position the tabulating element at a second position at which the tabulating element can be processed with another area for sensing, accordingly.

10. In an apparatus of the class described for duplicating a plurality of areas processed for sensing positioned within the marginal edges of a control element in a tabulating element; the improvement comprising in combination: means for positioning a control element positioning means and a tabulating element positioning means at a first position, for sensing and processing, for a sensing means to sense a processed area of the control element and a processing means to process an area of the tabulating element for sensing; means to move and engage the sensing means and the processed area of the control element to move and position the processing means to process an area of the tabulating element for sensing; means to activate the processing means to process the said area; means to disengage the sensing means and the processed area of the control element; releasing means to release the first named means after disengagement of the sensing means and the processed area of the control element; moving means, to move the control element positioning means and the tabulating element positioning means, when the first named means is released to position the control and tabulating elements at a second position, for sensing and processing for the sensing means to sense another processed area of the control element and the processing means to process another area of the tabulating element for sensing, accordingly.

11. In an apparatus of the class described for duplicating a plurality of areas processed for sensing positioned within the marginal edges of a control element in a tabulating element; the improvement comprising in combination: means for positioning a control element positioning means and a tabulating element positioning means at a first position, for sensing and processing, for a sensing means to sense a processed area of the control element and a processing means to process an area of the tabulating element for sensing; means to move and engage the sensing means and the processed area of the control element to move and position the processing means across a face of the tabulating element to process an area thereof for sensing, the area in position substantially corresponding to that of the processed area of the control element; means to activate the processing means to process the said area in the tabulating element; means to disengage the sensing means and the processed area of the control element; releasing means to release the first named means after disengagement of the sensing means and the processed area of the control element; moving means, to move the control element positioning means, when the first named means is released, and the tabulating element positioning means to position the control and tabulating elements at a second position, for sensing and processing, for the sensing means to sense another processed area of the control element and the processing means to process another area of the tabulating element for sensing, accordingly.

References Cited in the file of this patent

UNITED STATES PATENTS

| | | |
|---|---|---|
| 1,424,856 | Spicer | Aug. 8, 1922 |
| 1,788,694 | Thomas | Jan. 13, 1931 |
| 1,817,631 | Lake et al. | Aug. 4, 1931 |
| 1,871,060 | Hoffman | Aug. 9, 1932 |
| 1,991,729 | Brougham | Feb. 19, 1935 |
| 2,110,854 | Fuller et al. | Mar. 15, 1938 |
| 2,134,815 | Elliott | Nov. 1, 1938 |
| 2,144,412 | McCart | Jan. 17, 1939 |
| 2,519,031 | Drachman | Aug. 15, 1950 |
| 2,620,726 | Torkelson | Dec. 9, 1952 |
| 2,664,815 | Schuessler | Jan. 5, 1954 |
| 2,768,691 | Cooper et al. | Oct. 30, 1956 |

FOREIGN PATENTS

| | | |
|---|---|---|
| 252,734 | Great Britain | June 9, 1927 |